United States Patent [19]

De Simone

[11] 4,456,243
[45] Jun. 26, 1984

[54] ORIGINAL FEEDER FOR COPYING MACHINES

[75] Inventor: Pantaleo De Simone, Cuorgnè, Italy

[73] Assignee: Ing. C. Olivetti & C., S.p.A., Ivrea, Italy

[21] Appl. No.: 312,992

[22] Filed: Oct. 19, 1981

[30] Foreign Application Priority Data

Oct. 20, 1980 [IT] Italy .................... 68597 A/80

[51] Int. Cl.³ .................... B65H 5/06; B65H 9/06
[52] U.S. Cl. .................... 271/245; 271/227; 271/235; 355/75; 355/14 SH
[58] Field of Search .............. 271/245, 227, 246, 235, 271/233, 250, 247, 258, 259, 264, 265; 355/75, 3 SH, 14 SH

[56] References Cited

U.S. PATENT DOCUMENTS

| | | | |
|---|---|---|---|
| 672,529 | 4/1901 | Hunter | 271/245 |
| 2,953,372 | 9/1960 | Williams et al. | 271/264 |
| 3,510,125 | 5/1970 | Krueger et al. | 271/233 |
| 3,844,552 | 10/1974 | Bleau et al. | 271/245 |
| 3,863,912 | 2/1975 | Korff | 271/245 |
| 4,170,414 | 10/1979 | Hubert et al. | 271/259 |

FOREIGN PATENT DOCUMENTS 54-65969 5/1979 Japan .................... 271/258

OTHER PUBLICATIONS

Xerox Disclosure Journal vol. 3, No. 2, Mar./Apr. 1978, pp. 123-125 Taylor.
IBM Tech. Disc. Bull. Cole and Matuck vol. 19, No. 3, Aug. 1976.

Primary Examiner—Bruce H. Stoner, Jr.
Assistant Examiner—James E. Barlow
Attorney, Agent, or Firm—W. R. Hulbert

[57] ABSTRACT

An original document feeder for copying machines, for automatically positioning originals of any substance on the exposure surface, so avoiding opening and closing the original pressing cover at each change of original, and with a considerable reduction in idle times. The feeder comprises a set of friction rollers of flexible material mounted on a single shaft, these facing each other in a transverse slot so as to compel each original sheet to bend in such a manner as to exert a force against the rollers which is greater the higher the substance or rigidity of the sheets. The feeder is also provided for a device for automatically aligning the originals, and a timer system for coordinating the conveying stages of the originals with the copying machine cycle.

7 Claims, 7 Drawing Figures

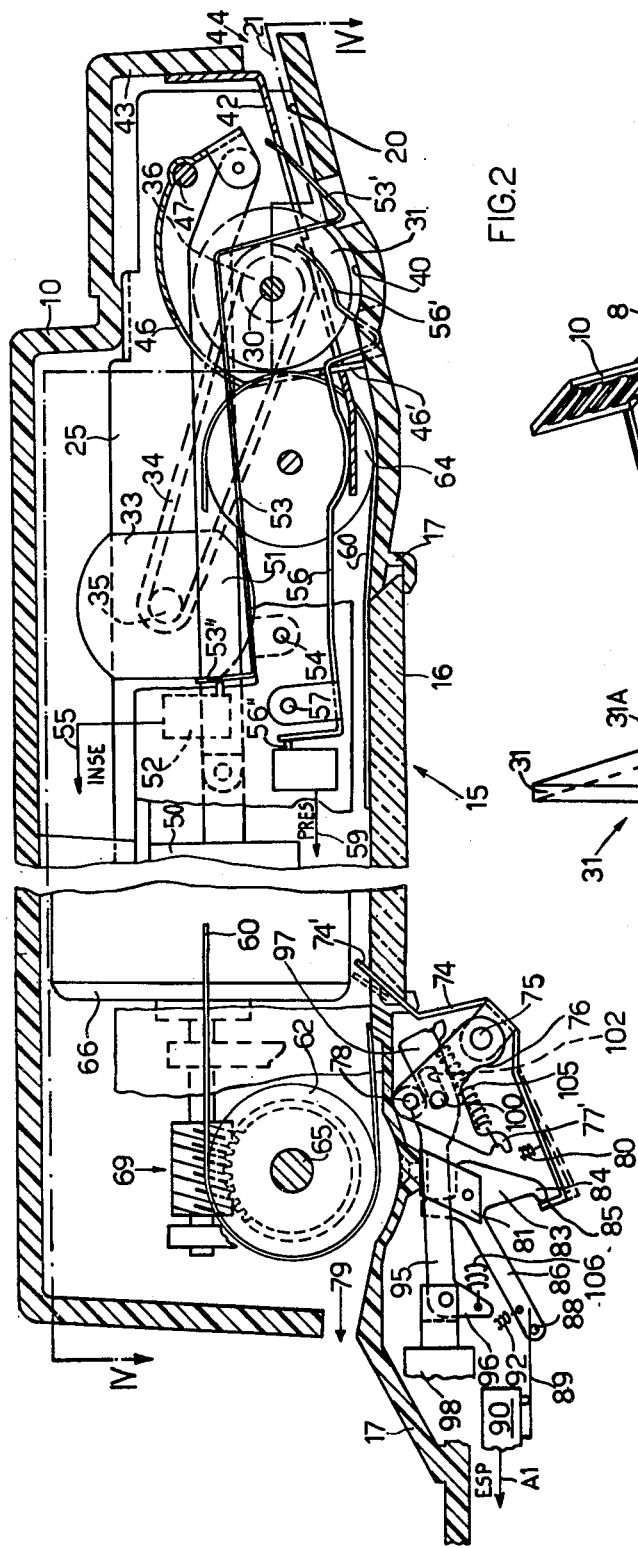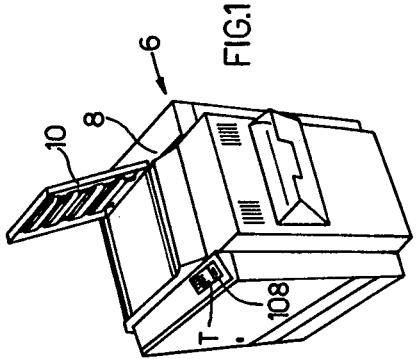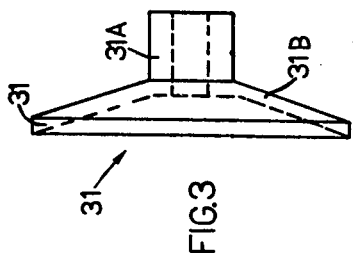

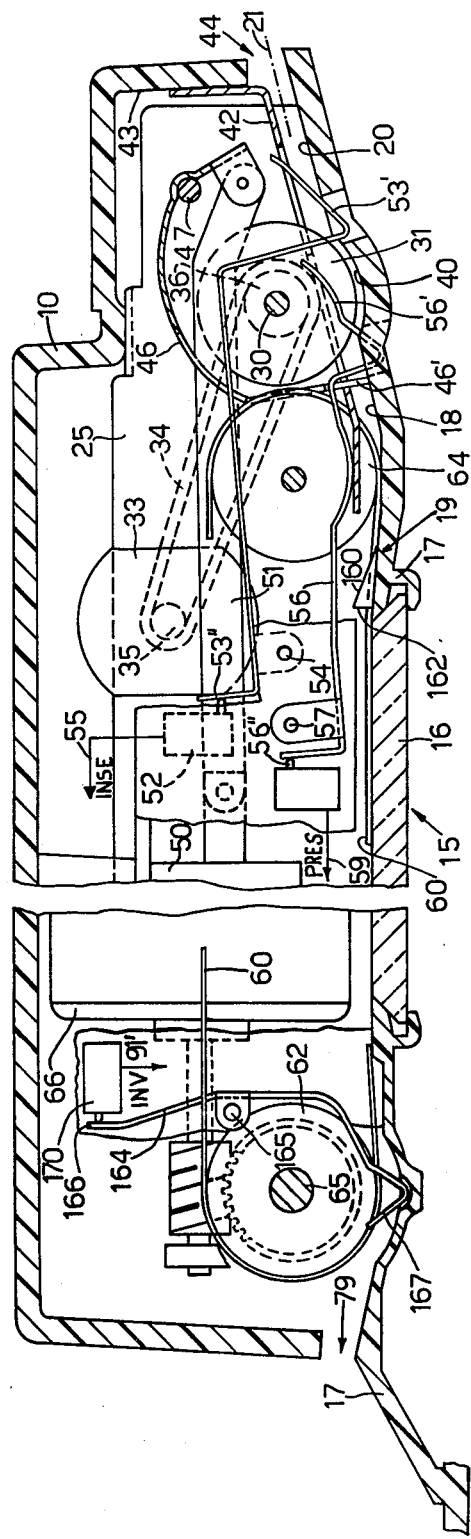

ORIGINAL FEEDER FOR COPYING MACHINES

BACKGROUND OF THE INVENTION

This invention relates to an original document feeder for copying machines, and more particularly to a feeder for automatically positioning an original document on the exposure surface, comprising a plurality of friction wheels which rotate in order to feed an original document on to an exposure surface, and reference means which are selectively operable in order to align said documents in the feed direction.

From U.S. Pat. No. 4,170,414, an automatic document feeder for copying machines is known in which the documents are fed and aligned by motorised rollers pressed constantly against a slide surface in order to drag the documents one at a time against a mobile reference device for the purpose of correctly aligning the documents. a sensor disposed in proximity to the reference device halts the dragging rollers as soon as a document makes contact with the reference device. However, because of the inertia of the moving parts, the rotation of the rollers is not interrupted instantaneously when the sheet reaches the mobile reference device, but continues for a short period to cause the rollers to slide on the sheet. Now if the original sheet has a normal substance, i.e. from 60 to 80 g/m$^2$, it has sufficient rigidity to resist the friction force applied by the rollers without bending. However, if the original sheets consist of very light sheets of paper, for example manifold paper having a substance of between 40 and 60 g/m$^2$, with consequent low rigidity, they do not resist the friction force applied to them by the rollers, and thus wrinkle and bend, giving rise to inferior copies and ruining the original.

SUMMARY OF THE INVENTION

The original document feeder according to the invention obviates the aforesaid drawbacks, and is arranged for automatically positioning originals of any substance on the exposure surface, without damaging the originals and so avoiding opening and closing the original pressing cover at each change of original; and with a considerable reduction in idle times.

The feeder comprises a set of friction rollers made of flexible material, mounted on a single shaft and facing a transverse curved slot as to compel each original sheet to bend it in such a manner as to exert a force against the rollers, which is greater the higher thickness or the rigidity of the sheets and vice versa. The feeder is also provided with means for automatically aligning the originals on the exposure surface of the copying machine, and with a timer system for coordinating the conveying steps of the originals with the copying machine cycles.

BRIEF DESCRIPTION OF THE DRAWINGS

These and further characteristics will be apparent from the description of a preferred embodiment given hereinafter by way of non-limiting example with reference to the accompanying drawings, in which:

FIG. 1 is a perspective view of a copying machine using an original feeder according to the invention;

FIG. 2 is a longitudinal section through the original feeder;

FIG. 3 is a detail of the pulleys of FIG. 2;

FIG. 7 is a modification of FIG. 2 according to a further aspect of the invention.

With reference to FIG. 1, the reference numeral 6 indicates a copying machine comprising an original feeder contained in a plastics cover 10 for covering the orginals. This is pivoted on a shaft 8 carried by the copying machine 6, and is counterbalanced by a pair of springs 9 wound on the shaft 8 (FIG. 4).

Figure 4:
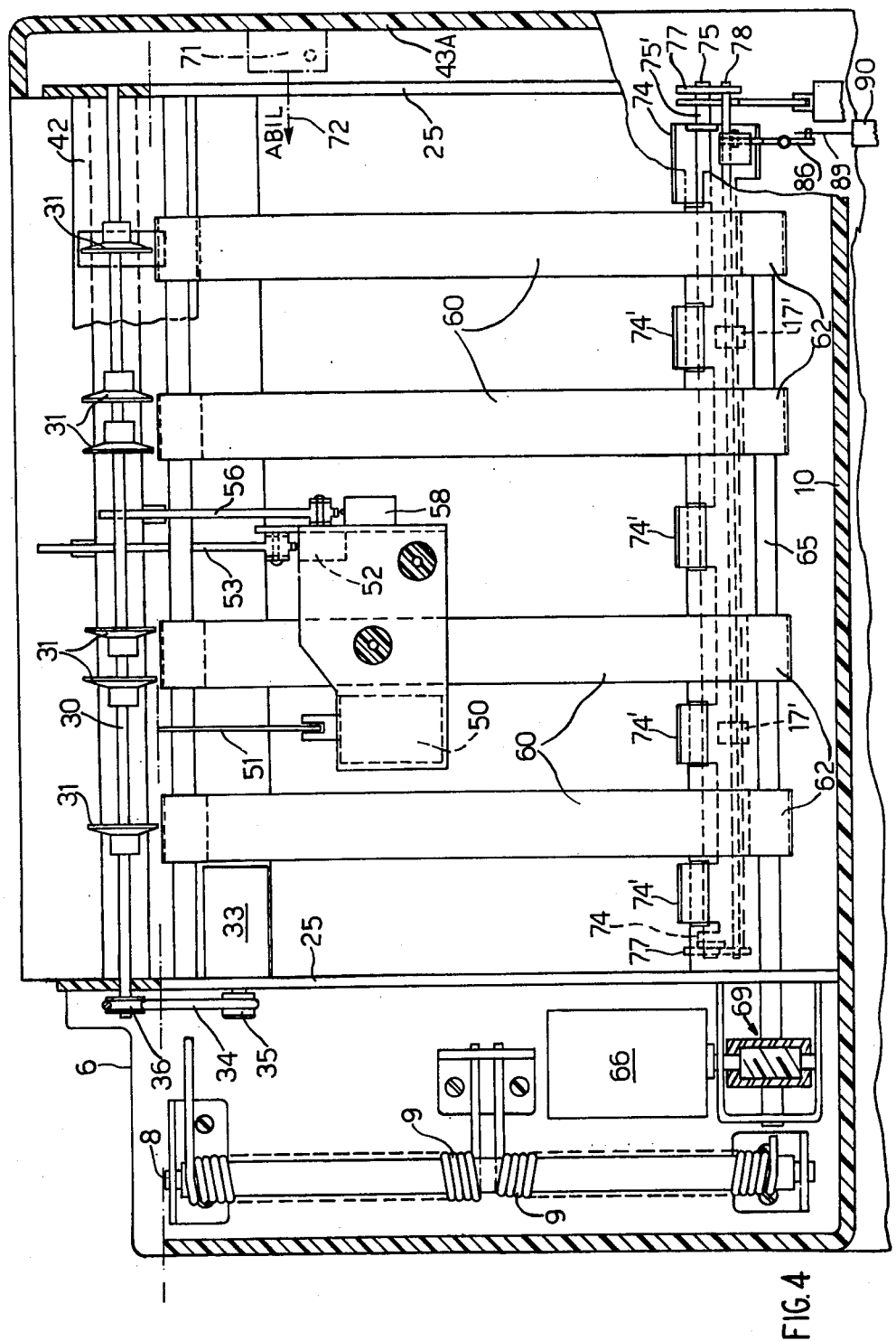
FIG. 4 is a plan view of the feeder of FIG. 2 to a reduced scale.

A surface 15 for exposing the originals is formed by a flat transparent support 16 (FIG. 2), and is fixed in a semi-rigid manner to the upper structure 17 of the copying machine. In its lateral part (to the right in FIG. 2), the structure 17 comprises an inclined surface 20 for introducing the originals 21. A frame 25 fixed to the cover 10 supports all the moving parts of the feeder, as is described hereinafter. A plurality of cup-shaped friction wheels 31 of elastic material, for example rubber, are mounted rigidly on a shaft 30 rotatable on the frame 25 (FIGS. 3 and 4). Each wheel 31 (FIG. 3) is formed from a hub 31A keyed on to the shaft 30. A hollow frusto-conical crown 31B of small thickness relative to its outer diameter is connected to the hub 31A. The crown 31B is bounded by a cylindrical surface 31C, which is coaxial to the hub, and constitutes the outer surface for dragging the sheet 21. The frusto-conical shape of the crown 31B gives the wheels 31 a considerable elastic yieldability in the radial direction, so that they are able to deflect to a greater or lesser degree with the passage of originals of greater or lesser rigidity.

The shaft 30 is rotated by an electric motor 33 (FIG. 2) by way of a belt 34 which winds about two pulleys 35 and 36. A transverse slot 40 is provided parallel to the shaft 30 on the inclined surface 20, in a position corresponding with the wheels 31. The slot 40 has a cross-section in the form of a circular arc profile with its centre on the axis of the shaft 30, and is positioned such as to leave a gap of about 1 mm from the edge 31C (FIG. 3) of the pulleys 31. A metal guide 42, fixed to a side wall 43 of the cover 10, is disposed a short distance from the surface 20 in order to constitute a slot 44 for introducing the originals 21. A mobile curved plate 46 for adjusting and aligning the originals is fixed to a shaft 47 rotatable on the frame 25. The free end 46' of the curved plate 46 is arranged, when in its rest position, to intercept the path of the original 21 immediately after the wheels 31 in the introduction direction. By means of a bar 51, an electromagnet 50 rotates the curved plate 46 clockwise in order to withdraw it from the path of the original 21, and to permit the original to advance on the exposure surface 15 in the manner described hereinafter. When an original 21 is introduced into the slot 44, an end 53' of a feeler lever 53 pivoted on a fixed pin 54 is raised. The end 53" of the lever 53 operates a microswitch 52 in order to feed a signal INSE over a wire 55 leaving the microswitch 52.

Likewise when the original 21 reaches the curved plate 46, it raises one end 56' of a feeler lever 56 pivoted on a fixed pin 57. The other end 56" of the lever 56 operates a microswitch 58 in order to feed a signal PRES over a wire 59 leaving the microswitch 58.

The original sheet 21 is conveyed on to the exposure surface 15 by a set of belts 60 (FIG. 2) which wind about two corresponding groups of pulleys 62 and 64 (FIGS. 2, 4). The pulleys 62 are mounted on a drive shaft 65, which is rotated by a motor 66 by way of a worm-helical gear pair 69. On the front wall 43A of the cover 10 (FIG. 4) there is fixed a microswitch 71 arranged to generate over a wire 72 a signal ABIL, which is at logic zero when the cover 10 is lowered and at logic 1 when the cover is raised.

A mobile plate 74 of elongated shape is disposed along an edge 16' of the exposure surface 16 (to the left of FIGS. 2 and 4) transversely to the direction of motion of the originals.

The plate 74, which hereinafter will be known as the rear register, is provided with a plurality of lugs 74' projecting into the free spaces between the belts 60 above the exposure surface 16, in such a manner that when in their normal position they intercept the path of the originals 21. The register 74 is pivoted on ends 75 of a bar 75' of an auxiliary frame 76 formed by a pair of side pieces 77 rigidly connected together by the bar 75' and by a shaft 78. The shaft 78 is pivoted on two appendices 17' of the structure 17, in such a manner that the frame 76 can rotate about the axis of the shaft 78.

The register 74 can therefore move downwards (FIG. 2) as a result of the clockwise rotation of the frame 76, and can rotate about the ends 75 through a small angle, overcoming the action of a spring 80 which maintains it in its normal position as shown by full lines in FIG. 2.

A L-shaped lever 83 is pivoted to a support 81 fixed to the structure 17, and is retained in its normal position indicated in FIG. 2 by a lug 85 of the register 74, which engages an end 84 of the lever 83, so preventing it from rotating clockwise by the action of a spring 92 connected to an arm 86 of the lever 83.

A peg 88 on the arm 86 engages a lever 89 of a microswitch 90. A bar 95 is connected at one end 96 to an electromagnet 98, and is supported at a slot 102 at the other end 97, by a pin 100 fixed to one of the side pieces 77.

A spring 105 is stretched between the end 97 of the bar 95 and an appendix 77' of the auxiliary frame 76. The other end 96 of the bar 95 is connected by a spring 106 to a fixed point of the structure 17.

The spring 106 has a rigidity greater than that of the spring 105, so that when the electromagnet 98 is deenergised, as described hereinafter, the spring 106 pulls the bar 95 towards the right (FIG. 2), and the spring 105 has to yield when the register 74 is unable to rise because of the presence of an unexpelled original.

Figure 5:
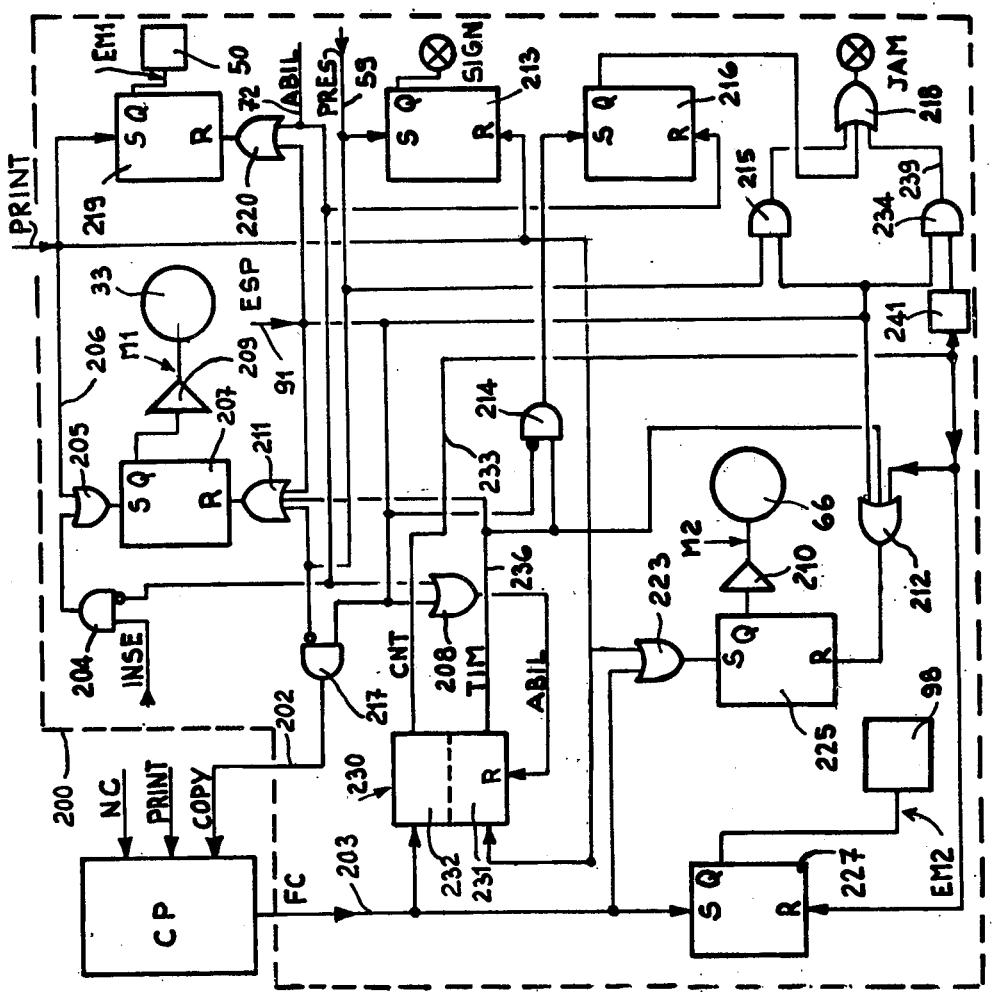
FIG. 5 is the logic control circuit diagram.

FIG. 5 shows a logic unit 200 for handling the signals emitted by the microswitches 52, 58, 90 and for generating control signals for the electromagnets 50, 98 and the motors 33 and 66. The logic unit 200 is also connected by two wires 202, 203 to a microprocessor CP which controls the general logic of the copying machine 6 (FIG. 1).

The operation of the feeder is as follows. In order to feed the copying machine with a new original, the sheet 21 of the new original is inserted into the slot 44 (FIG. 2) until it raises the feeler 53'. The signal INSE is fed over the wire 55 to an AND gate 204 (FIG. 5) at which the negated signal ABIL also arrives. The output of the AND gate 204 is connected to one input of an OR gate 205 which activates the FF 207 when INSE=1 and ABIL=0, i.e. when the cover is lowered.

The output Q of the FF 207 goes to logic level 1 and activates a power unit 209 of known type in order to operate the motor 33. The motor 33 rotates the pulleys 31 (FIG. 2) in a clockwise direction.

The sheet 21 is dragged by friction by means of the wheels 31 through the slot 40, in which it is bent elastically according to the curvature of the slot itself. The combination of the wheels 31 with the slot 40 enables originals of any substance to be fed, and in particular originals formed from very light sheets such as the manifold paper used for typed copies, without these becoming bent or crumpled.

In this respect, for small deformations, each sheet of paper behaves resiliently, with a rigidity approximately proportional to the substance of the paper. Consequently, when a sheet 21 is introduced between the wheels 31 and the slot 40, by virtue of the deformation which it undergoes it exerts against the cylindrical surface 31C (FIG. 3) of the wheels 31 a certain resilient reaction which, combined with the coefficient of friction between the wheels 31 and the sheet 21, generates the forces which drag the sheet.

Consequently the dragging force also depends on the substance of the sheets. Sheets of normal substance, i.e. between 60 and 80 g/m$^2$, are dragged with a greater force than manifold paper sheets having a lower substance of between 30 and 50 g/m$^2$. Moreover, the dragging force does not exceed a determined value, so that when the sheet halts against the curved plate, 46, the pulleys slip on the sheet without damaging it. Slightly before touching the curved plate 46 with its front edge, the sheet 41 raises the feeler 56', which operates the microswitch 58 in order to emit the signal PRES over the wire 59. This signal is required to perform two functions, namely to stop the motor 33 and indicate the presence of the original against the curved plate 46. For this purpose, the signal PRES (FIG. 5) is fed to an OR gate 211 which resets the FF 207, so that the circuit 209 becomes deactivated and the motor 33 stops.

The signal PRES is also fed to the set input of a FF 213, to an AND gate 215 and, inverted, to an AND gate 217. Consequently, the FF 213 puts its output Q at 1, to illuminate a lamp SIGN in order to indicate the presence of the original in the slots 44 in the correct position for subsequent feeding on to the exposure surface.

At this point, the operator sets the number of required copies on the control panel T and presses the PRINT button 108 (FIG. 1) which energises the electromagnet 50 by means of an FF 219 (FIG. 2). Consequently, the bar 51 is moved to the left in order to raise the curved plate 46. Simultaneously the signal PRINT is fed to the OR gate 205 (FIG. 5), to the reset input R of the FF 213, and to an OR223 connected to an FF 225.

In this manner the FF 207 and FF 225 respectively activate the power units 209 and 210, by which the motors 33 and 66 are rotated. Finally the lamp SIGN is extinguished by the FF 213, because this is reset by the signal PRINT.

By rotating the wheels 33 clockwise, the motor 33 (FIG. 2) causes the original 21 to advance until it is taken up and dragged by the belts 60 driven by the motor 66. Simultaneously, the signal PRINT activates a timer circuit 230 (FIG. 5) to define a first time interval $t_o$ for deactivating the motor 66 after this interval. In particular, the timer circuit 230 comprises a first counter 231 which is activated by the signal PRINT, and which after the time interval $t_o$, for example 0.8 seconds, emits a signal TIM=1 over a wire 236 connected to an AND gate 214, to the OR gate 211 and to the OR gate 212, so that the motors 33 and 66 are halted.

After the original 21 has been conveyed by the belts 60 on to the exposure surface 15 until it engages the register 74, this latter rotates through a small angle in an anti-clockwise direction about the pin 75 until it reaches the position shown by dashed lines in FIG. 2. The small anti-clockwise rotation which the register 74 makes when a sheet encounters it causes the sheet to stop in a gradual and delayed manner against the register 74, to enable the belts 60 to stop after the microswitch 90 has been operated.

By virtue of the rotation of the register 74, the end 84 of the lever 83 is freed from its engagement with the lug 85, and the lever 83 can rotate clockwise about the support 81 by the effect of the spring 92, so that the arm 86 operates the microswitch 90, which feeds the signal ESP=1 over the wire 91 (FIGS. 2 and 5). The signal ESP at logic level 1 performs the following simultaneous functions:

(a) starting the copying cycle; (b) stopping the motor 33; (c) deenergising the electromagnet 50; (d) stopping the motor 66.

In particular, the signal ESP is fed to the AND gate 217, the output of which goes to 1 (COPY =1) if PRES is at zero, i.e. the processor receives the signal COPY=1 if the sheet 21 has passed beyond the feeler 56 (FIG. 1) and has become positioned against the register 74. Simultaneously, the signal ESP stops the two motors 33 and 66, resetting the corresponding FF 207 and FF 225 respectively be means of the OR gates 211 and 212. In addition, it resets the FF 219 to deenergise the electromagnet 50. The processor CP starts the copying cycle on the basis of the signal COPY=1, and on the basis of a signal indicative of the number of copies set on the control panel T, indicated for brevity by NC in FIG. 5. If for any reason the sheet does not arrive against the register 74 within the predetermined time interval $t_o$, the counter 231 resets the signal TIM=1 over the wire 236, while the microswitch 90, not being operated by the curved plate 76, maintains the signal ESP at the logic zero level.

The signal TIM is fed to the FF 207 and FF 225 in order to respectively stop the motors 33 and 66 of the AND gate 214, and is also fed to the FF 216 and to the OR gate 218 in order to light the lamp JAM. The negated ESP signal is also fed to the AND gate 214, so that the lamp JAM lights when TIM=1 and ESP=0.

The operator must then act in order to remove the jammed sheet by raising the cover 10. In this manner, the microswitch 71 emits the signal AB1L=1 which resets the FF 219 to deenergise the electromagnet 50, resets the FF 216 to extinguish the lamp JAM, and resets the counter 231 by way of an OR gate 208. At this point, on lowering the cover 10, the original can again be inserted into the slot 44 for a new copying stage.

At the end of the copying cycle, the processor CP feeds a signal FC=1 over the wire 203 to the FF 227 to energise the electromagnet 98, and, by way of the OR gate 223, to the set input S of the FF 225 which again causes the motor 66 to start. The electromagnet 98 moves the bar 95 towards the left (FIG. 2), overcoming the action of the spring 106. Consequently, the spring 105 is released, to enable the auxiliary frame 76 to rotate clockwise about the shaft 78 by the effect of its own weight, so that the register 74 is lowered and removes the lugs 74' from the path of the sheet 21, which is expelled by the belts 60 towards the outlet 79 (FIG. 2). The signal FC=1 is also fed to the timer circuit 230 to define a second time interval $t_1$ in order to deenergise the electromagnet 98 after this interval and to stop the motor 66. More particularly, the timer circuit 230 comprises a second counter 232 which is started by the signal FC=1 and which, which the time interval $t_1$, for example one second, has passed feeds a signal CNT=1 over the wire 233, by which the electromagnet 98 and motor 66 are deactivated, as is described in detail hereinafter. In addition, when the register 74 has been lowered, the spring 80 rotates it in a clockwise direction, so that the lug 85 engages the end of the lever 86, so that it becomes set to return the lever 83 to its normal position when the electromagnet 91 is deenergised. If the expulsion stage takes place in a regular manner within the time interval $t_1$ predetermined by the counter 232, the FF 227 becomes reset when CNT goes to level 1, and the electromagnet 98 is thus deenergized. The FF 225 is also reset in order to stop the motor 66. The spring 106 pulls the bar 95 to the right, so putting the spring 105 under tension, and this rotates the auxiliary frame 77 in an anti-clockwise direction, so that the register 74 becomes raised and returned to its original position shown by full lines. The lug 85 of the register 74 rotates the lever 86 in an anti-clockwise direction, thus deenergising the microswitch 90 which returns the signal ESP to zero. If the expulsion stage has not taken place in a regular manner because the sheet 21 has not been expelled for any reason, the register 74 is unable to rise because it is obstructed by the original which has remained on the exposure surface 15, and the microswitch 90 remains energised, i.e. ESP=1. The signal CNT is then fed, suitably delayed by a delay circuit 241 of known type, to the AND gate 234 which lights the lamp JAM in order to indicate a jammed condition.

Figure 6:
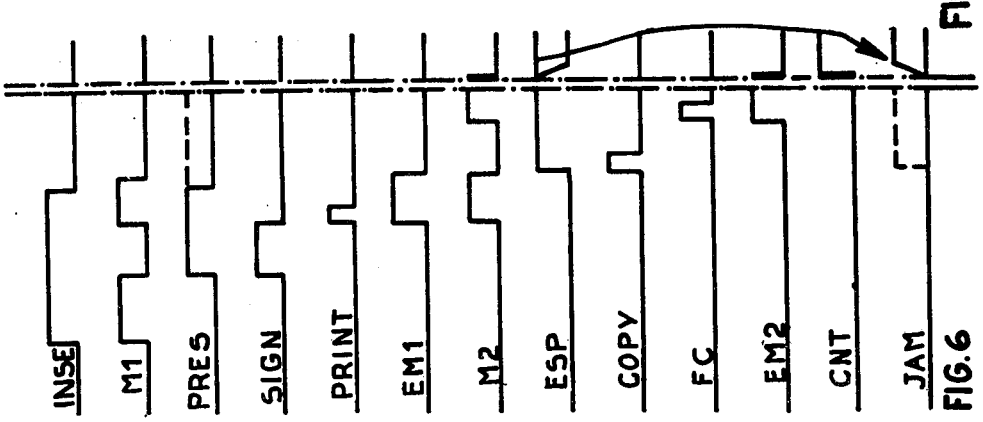
FIG. 6 is a timing diagram.

The operator must then act to remove the jammed sheet in order to enable the register 74 to rise and put the signal ESP to logic zero, so that the lamp JAM becomes extinguished. FIG. 6 shows the timing of the signals handled by the circuit 200 of FIG. 5, and in addition the pattern of the voltages M1, M2 applied respectively to the motors 33 and 66 and of the voltages EM1, EM2 applied respectively to the electromagnets 50 and 98 are also shown. FIG. 7 shows a modification of the original feeder according to a further aspect of the invention. Stops, disposed between the belts 60 and aligned transversely to the direction of motion of the sheet 21, are provided on the structure 17 immediately downstream of the pulleys 64 in the direction of movement of the sheet 21. Each stop 19 is formed by a ramp 160 smoothly connected to the slide surface 18 for the sheet 21 and terminating in a step 162 at the joining line between the structure 17 and the transparent surface 16.

The step 162 has a height slightly greater than the thickness of the belts 60, and its purpose is to align and correctly position the sheet 21 on the surface 16. In this respect, the stop 19 allows passage of a sheet under movement from right to left in FIG. 7, whereas it constitutes a reference stop for the sheet when moving in the opposite direction to the preceding.

The distance between the step 162 and the end 167 of the lever 164 is greater than the length of the maximum copyable format. During operation, the document 21 to be copied is dragged by the belts 60 in the manner already described, until its front edge intercepts the end 167 of the lever 164, which closes the microswitch 170. The microswitch 170 then feeds a signal INV over a wire 91' connected to a conventional logic circuit comprising a flip-flop circuit and a timer, not shown on the drawings, this signal stopping the motors 66 and 33 and restarting only the motor 66 in the opposite direction for a short period of time, for example 1 second. In this manner, the original 21 is moved backwards against the step 162, to be correctly positioned for copying.

At this point, the copier can initiate the copying cycle in the manner already described, and after copying one or more copies the original document is expelled through the slot 79 by means of the belt 60.

Modifications, additions or substitutions of parts can be made to the device heretofore described, without leaving the scope of the present invention.

I claim:

1. Original feeder for copying machine and similar office machines, comprising moving means to feed original documents onto an exposure surface in a registered position, selectively operable reference means adjacent to the output side of said surface to align said documents, and control means responsive to said reference means to control the movement of said document, wherein said reference means includes a stop element mobile from a stopping position to stop said document, to a second position for releasing the document, said stop element being pivoted on an auxiliary frame which swings from a rest position to a working position, said frame being kept in said rest position by a first spring element stretched between said auxiliary frame and selectively movable member, whereby when said stop element is in said stopping position, it is rotated through a predetermined angle by said document arriving on said exposure surface in order to deactivate said moving means for stopping the fed document against the stop element.

2. Feeder as claimed in claim 1, wherein, when energised, an electromagnet moves said slider from a first position in which said stop element is in said stopping position, to a second position in order to swing said frame to its working position.

3. Feeder as claimed in claim 2, wherein said slider is pulled towards said first position by a second spring to return said frame to said rest position when said electromagnet is deenergised, said second spring having a rigidity greater than said first spring.

4. Feeder as claimed in claim 1, wherein a two-position lever, which is normally engaged with said stop element, is released and rotated into a final position when said stop element is rotated through said predetermined angle to close a microswitch in order to operate said control means to deactivate said moving means.

5. Feeder as claimed in claim 4, wherein said two-position lever is re-engaged by said stop element when said frame is returned to its rest position, whereby said microswitch is opened allowing said control means to activate said moving means.

6. Feeder as claimed in claim 1, wherein said control means comprises a timer circuit defining a first predetermined time interval in order to deactivate said means for moving if said stop element is not rotated by said document after said first time interval.

7. Feeder as claimed in claim 6, wherein said timer circuit defines a second predetermined time interval to deactivate said means for moving if said document is retained on said exposure surface beyond said second time interval.

* * * * *